United States Patent
Jung et al.

(10) Patent No.: US 8,363,742 B2
(45) Date of Patent: Jan. 29, 2013

(54) METHOD AND APPARATUS FOR DETECTING RECEIVED SIGNAL IN WIRELESS COMMUNICATION SYSTEM

(75) Inventors: Hoi-Yoon Jung, Daejeon (KR); Sun-Min Lim, Daejeon (KR); Sang-Won Kim, Daejeon (KR); Myung-Sun Song, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 110 days.

(21) Appl. No.: 12/837,777

(22) Filed: Jul. 16, 2010

(65) Prior Publication Data

US 2011/0129006 A1    Jun. 2, 2011

(30) Foreign Application Priority Data

Nov. 30, 2009    (KR) .................. 10-2009-0117391

(51) Int. Cl.
*H04K 1/10* (2006.01)

(52) U.S. Cl. ........ 375/260; 375/224; 375/262; 375/267; 375/316; 375/340; 375/343

(58) Field of Classification Search .......... 375/224, 375/260, 316, 262, 267, 324, 340, 343; 370/203, 370/204, 205, 208, 210, 329, 338, 342
See application file for complete search history.

(56) References Cited

U.S. PATENT DOCUMENTS

| | | | |
|---|---|---|---|
| 6,950,511 | B2 | 9/2005 | Das et al. |
| 7,483,836 | B2 * | 1/2009 | Taori et al. ............... 704/500 |
| 8,064,897 | B2 * | 11/2011 | Matsumoto et al. ........ 455/423 |

FOREIGN PATENT DOCUMENTS

| | | |
|---|---|---|
| JP | 2009-005156 A | 1/2009 |
| KR | 2009-0008412 A | 1/2009 |

OTHER PUBLICATIONS

Monisha Ghosh et al., "Spectrum Sensing Prototype for Sensing ATSC and Wireless Microphone Signals", 3rd International Conference on Cognitive Radio Oriented Wireless Networks and Communications (Crowncom), pp. 1-7, May 2008.

* cited by examiner

*Primary Examiner* — Dhaval Patel
(74) *Attorney, Agent, or Firm* — Rabin & Berdo, P.C.

(57) ABSTRACT

A method for detecting a received signal includes: dividing the entire band of the received signal into N frequency components where N is a natural number larger than one, and deciding a reference frequency component containing a reference frequency as a first priority sensing band among the N frequency components; deciding the sensing priorities of the other (N−1) frequency components in such a manner that the sensing priorities spread in both directions from the first priority sensing band; calculating the magnitude of each of the N frequency components in accordance with the decided sensing priorities; comparing the calculated magnitude of the frequency component with a predetermined threshold value; and when the calculated magnitude of the frequency component is larger than the threshold value, determining that the received signal exists.

10 Claims, 3 Drawing Sheets

METHOD AND APPARATUS FOR DETECTING RECEIVED SIGNAL IN WIRELESS COMMUNICATION SYSTEM

CROSS-REFERENCE(S) TO RELATED APPLICATIONS

The present application claims priority of Korean Patent Application No. 10-2009-0117391, filed on Nov. 30, 2009, which is incorporated herein by reference in its entirety.

BACKGROUND OF THE INVENTION

1. Field of the Invention

Exemplary embodiments of the present invention relate to a method and apparatus for detecting a received signal; and, more particularly, to a method and apparatus for detecting a received signal in a wireless communication system.

2. Description of Related Art

In the spectrum sensing of a wireless communication system, a signal received by a sensing receiver is detected as follows. First, the spectrum components of the entire bands of the received signal are calculated. Then, the calculated spectrum components are used to determine whether the received signal exists or not. In this case, a fast Fourier transform (FFT) algorithm for calculating the entire frequency bands at one time is mainly used to calculate the spectrum components.

In the method for detecting a received signal using the FFT algorithm, the entire frequency bands of the received signal are calculated at one time, as described above. Therefore, the complexity of calculation is high. Furthermore, when the received signal is an Advanced Television Systems Committee (ATSC) signal or a National Television Systems Committee (NTSC) signal, unnecessary frequency components should be calculated together, even though a signal having a relatively strong intensity exists in a specific frequency band. Therefore, the amount of calculation inevitably increases.

Meanwhile, a general wired communication system detects a received signal through a tone detection technique using the Goertzel algorithm. The Goertzel algorithm is an algorithm considering a wired channel environment in which a frequency offset does not exist, that is, the frequency is not distorted while a wireless signal is transmitted through a channel. Therefore, when the Goertzel algorithm is applied to a wireless communication system, that is, a wireless channel environment, it is impossible to detect a wireless signal in which a frequency offset exists.

SUMMARY OF THE INVENTION

An embodiment of the present invention is directed to a method and apparatus for detecting a received signal, which is capable of reducing the complexity of calculation for detecting the received signal.

Another embodiment of the present invention is directed to a method and apparatus for detecting a received signal, which is capable of minimizing the amount of calculation for detecting the received signal.

Another embodiment of the present invention is directed to a method and apparatus for detecting a received signal, which may be used in an environment such as a wireless channel in which a frequency offset exists.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for detecting a received signal includes: dividing the entire band of the received signal into N frequency components where N is a natural number larger than one, and deciding a reference frequency component containing a reference frequency as a first priority sensing band among the N frequency components; deciding the sensing priorities of the other (N−1) frequency components in such a manner that the sensing priorities spread in both directions from the first priority sensing band; calculating the magnitude of each of the N frequency components in accordance with the decided sensing priorities; comparing the calculated magnitude of the frequency component with a predetermined threshold value; and when the calculated magnitude of the frequency component is larger than the threshold value, determining that the received signal exists.

In accordance with another embodiment of the present invention, an apparatus for detecting a received signal includes: a sensing priority decision unit configured to divide the entire band of the received signal into N frequency components where N is a natural number larger than one, decide a reference frequency component including a reference frequency as a first priority sensing band among the N frequency components, and decide the sensing priorities of the other (N−1) frequency components in such a manner that the sensing priorities spread in both directions from the decided first priority sensing band; a calculation unit configured to calculate the magnitude of each of the N frequency components in accordance with the decided sensing priorities, and compare the calculated magnitude of the frequency component with a predetermined threshold value; and a detection unit configured to decide that the received signal exists, when the calculation unit determines that the calculated magnitude of the frequency component is larger than the threshold value.

DESCRIPTION OF SPECIFIC EMBODIMENTS

Figure 1:
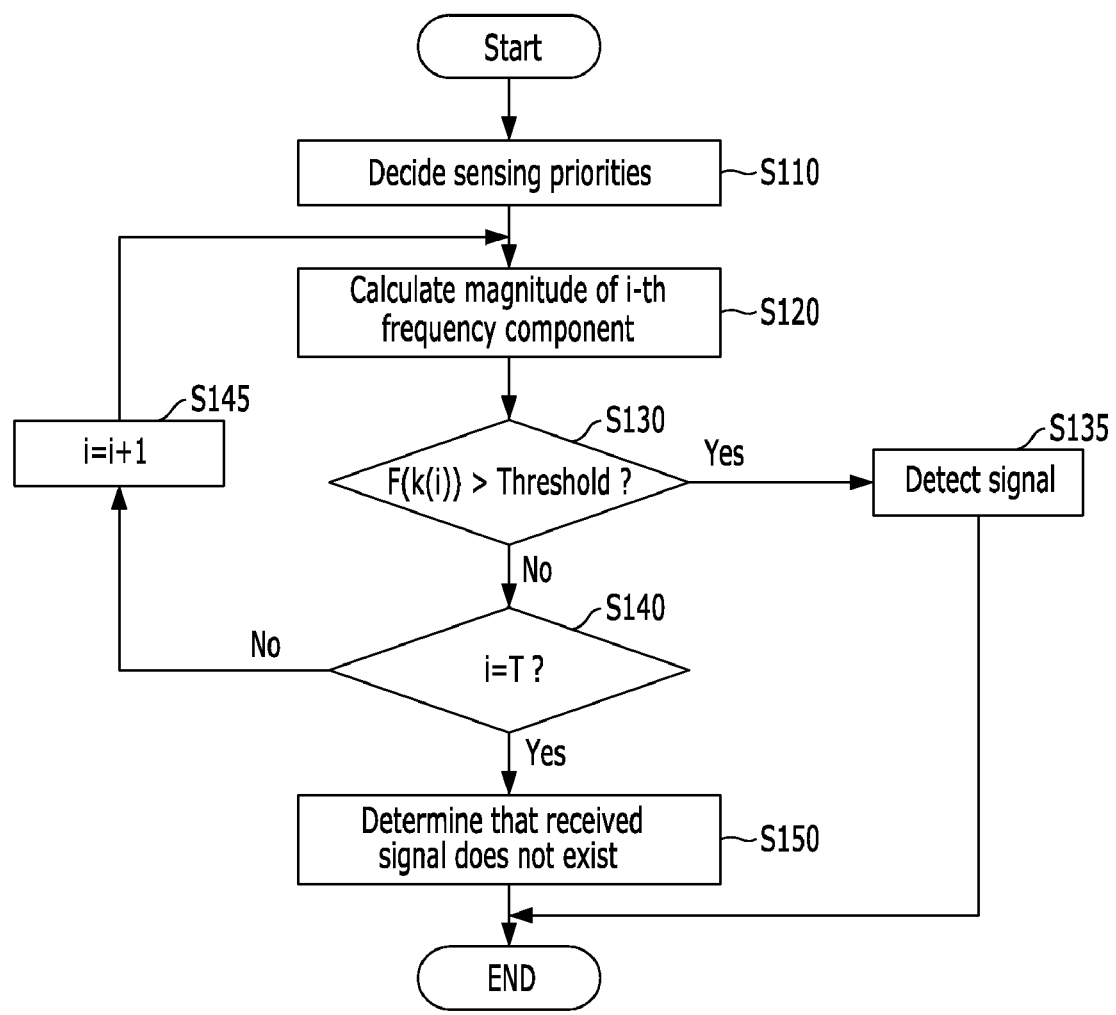
FIG. 1 is a flow chart explaining a method for detecting a received signal in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a flow chart explaining a method for detecting a received signal in accordance with an embodiment of the present invention. The received signal includes a signal which is received through a sensing receiver. To implement the method for detecting a received signal in accordance with the embodiment of the present invention, it is necessary to previously know the Rx band and characteristics of the received signal. For example, when the received signal is an ATSC signal, it is necessary to previously know the Rx band of the ATSC signal and at which frequency the ATSC signal has the largest intensity.

In the method for detecting a received signal in accordance with the embodiment of the present invention, sensing priorities are first decided in a step S110. The operation of detecting the sensing priorities is performed as follows.

In a state in which the entire band of the received signal is previously known, the entire band is divided into N frequency components. Here, N is a natural number larger than one. When N is relatively large, the received signal may be detected more clearly, but the amount of calculation increases. When N is relatively small, detection of an accurate signal may be not guaranteed, while the calculation amount decreases. Therefore, N may be decided by user's selection depending on a user's design scheme.

Specifically, the operation of detecting the sensing priorities will be described with reference to FIGS. 2 and 3.

Figure 2:
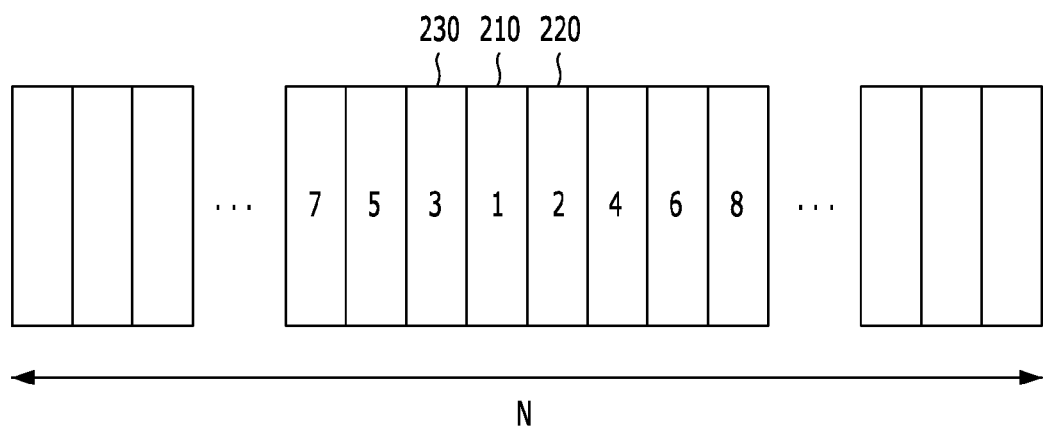
FIG. 2 is a diagram explaining an example of an operation of deciding the sensing priorities in the method for detecting a received signal in accordance with the embodiment of the present invention.

FIG. 2 is a diagram explaining an example of the operation of deciding the sensing priorities in the method for detecting a received signal in accordance with the embodiment of the present invention.

First, a reference frequency of the received signal is previously decided in the entire N frequency components of the received signal.

The reference frequency is decided as follows. For example, when a received signal to be detected is an ATSC signal, the frequency of a pilot signal of the ATSC signal is decided as the reference frequency. The frequency of the pilot signal of the ATSC signal has been previously determined in the ATSC standards. The reason that the frequency of the pilot signal of the ATSC signal is decided as the reference frequency is that the frequency of the pilot signal has the largest magnitude in the ATSC signal.

As another example, when a received signal to be detected is an NTSC signal, a carrier frequency of voice or video is decided as a reference frequency. The carrier frequency of the NTSC signal has been previous determined in the NTSC standards. The reason that the carrier frequency of the NTSC signal is decided as the reference frequency is that the carrier frequency has the largest magnitude in the NTSC signal.

As described above, the reference frequency indicates a frequency at which the intensity of the received signal to be detected is the largest. This specification describes a case in which the received signal to be detected is an ATSC or NTSC signal. Without being limited thereto, however, the received signal detection method in accordance with the embodiment of the present invention may be used for detecting a wireless signal of which the intensity is the largest at a specific frequency in a wireless communication system to be developed in the future.

Meanwhile, when it is determined that the reference frequency of the received signal detected by the received signal detection method in accordance with the embodiment of the present invention is changed due to a frequency offset or the like, the changed reference frequency may be set to a reference frequency to detect the same signal as the received signal.

Among the N frequency components, a first frequency component 210 including the decided reference frequency is decided as a first priority sensing band.

Next, the priorities of the other frequency components are decided alternately in both directions from the first frequency component 210. That is, a second frequency component 220 positioned in the right side of the first frequency component 210 is decided as a second priority sensing band, and a third frequency component 230 positioned in the left side of the first frequency component 210 is decided as a third priority sensing band. In other words, the sensing priorities are decided in such a manner that they spread or recede alternately in both directions from the first frequency component 210 including the reference frequency.

Figure 3:
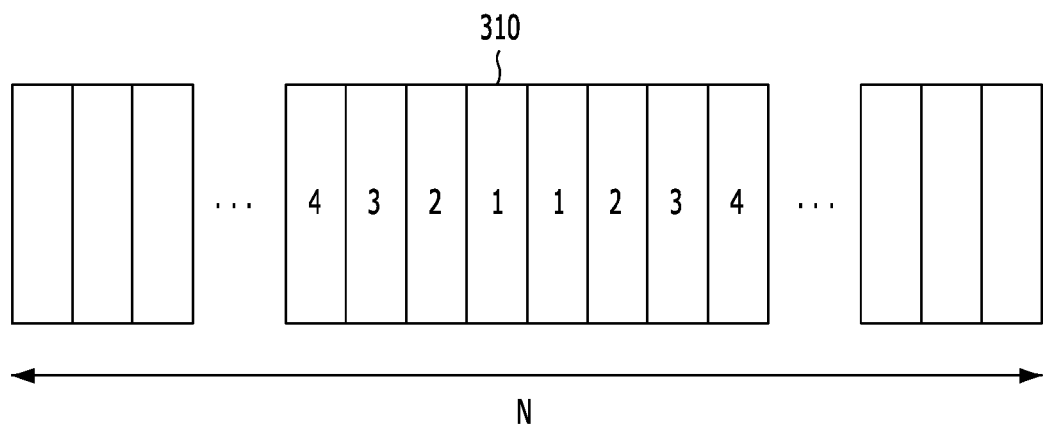
FIG. 3 is a diagram explaining another example of the operation of deciding the sensing priorities in the method for detecting a received signal in accordance with the embodiment of the present invention.

FIG. 3 is a diagram explaining another example of the operation of deciding the sensing priorities in the method for detecting a received signal in accordance with the embodiment of the present invention.

In FIG. 3, the sensing priorities of frequency components are decided in such a manner that they spread simultaneously in both directions from a first frequency component 310 including the reference frequency. The decision operations depend on the number of frequency component calculators. FIG. 2 illustrates a case in which one frequency component calculator is used, and FIG. 3 illustrates a case in which two frequency component calculators are used.

Returning to FIG. 1, the received signal detection method in accordance with the embodiment of the present invention will be described.

After the sensing priorities are decided in the step S110, sensing for the received signal is performed in accordance with the decided sensing priorities. That is, the first frequency component k(1) and the magnitude F(k(1)) of the first frequency component are calculated in step S120. To calculate the first frequency component, the discrete Fourier transform (DFT) algorithm or the Goertzel algorithm may be used. Without being limited thereto, however, any algorithm capable of calculating a specific frequency component may be used.

When the DFT algorithm is used, a frequency component may be calculated by the following process. When a received signal on a time axis is represented by x[a] and a p-th frequency component among the entire N frequency components (a=0, 1, ..., N−1) is represented by X(p), the frequency component X(p) may be expressed as Equation 1 below, based on the DFT algorithm.

$$X(p) = \sum_{a=0}^{N-1} x[a] W_N^{pa} \qquad \text{Eq. 1}$$

In Equation 1, $W_N^{pa}$ represents a DFT coefficient.

As expressed in Equation 1, a unit configured to perform the multiplication of the received signal and the DFT coefficient and the addition may be defined as a frequency component calculation unit. When one frequency component calculation unit is used to perform the calculation, only one frequency component may be calculated by one operation. A system including two frequency component calculation units may calculate two frequency components through one operation. As the number of frequency component calculation units within hardware increases, the time required for sensing may decrease, but the complexity of the hardware may increase. On the other hand, as the number of frequency component calculation units within hardware decreases, the time required for sensing may increase, but the complexity of the hardware may decrease. Therefore, the number of frequency component calculation units may be decided depending on user's selection.

Meanwhile, the Goertzel algorithm may be used to calculate the frequency component. Compared with when the DFT algorithm is used, the Goertzel algorithm has the following advantages. First, when the DFT algorithm is used to calculate the frequency component, N needs to be set to $2^m$ where m is a positive integer. However, the Goertzel algorithm may be applied to all positive integers N. That is, the amount of calculation decreases. Furthermore, when the Goertzel algorithm is used, the memory usage within the hardware decreases in comparison with the DFT algorithm.

After the first frequency component is calculated, the magnitude F(k(1)) of the first frequency component is calculated.

Next, a predetermined threshold value is compared with the magnitude F(k(1)) of the first frequency component in a step S130. When the magnitude of the first frequency component is larger than the threshold value, it is determined that the received signal exists in the first priority sensing band, and the received signal is detected in a step S135. Then, the sensing for the other frequency components is not performed, that is, the sensing is ended.

On the other hand, when the magnitude of the first frequency component is smaller than the threshold value, a second frequency component which is the next-highest priority sensing band is calculated in accordance with the previously decided sensing priorities through steps 145, 120, and 130. That is, only when the magnitude of a specific frequency component calculated in accordance with the sensing priorities is larger than the threshold value, it is determined that the received signal exists. Otherwise, the step 120 of calculating the next-highest priority frequency component and the step S130 of comparing the magnitude of the calculated frequency component with the threshold value are repeated.

When it is repetitively determined that the magnitude of the next-highest priority frequency component is smaller than the threshold value, the maximum repetition number may be set to the natural number N by which the entire band of the received signal is divided. When the maximum repetition number is set to N, the amount of calculation excessively increases in comparison with the FFT algorithm in which the entire frequency components are calculated at once. To solve such a problem, the maximum repetition number may be limited to a proper value.

Referring to FIG. 1, when it is determined in the step S130 that the magnitude of an i-th frequency component k(i) is smaller than the threshold value, it is determined whether i is equal to T or not, in a step S140. Here, T is a parameter for limiting the maximum repetition number, and is decided as a value selected by a user in the range of 1 to N. When T is set to a relatively small value, the amount of calculation may decrease, but a wireless signal having a large frequency offset may not be detected. On the other hand, when T is set to a relatively large value, a wireless signal having a large frequency offset may be detected, but the amount of calculation may increase.

Meanwhile, when the length L of the entire band of the received signal exceeds N, the above-described received signal detection process may be performed L/N times. Then, L/N sensing results may be obtained, and the final sensing result may be derived by various combinations of the L/N sensing results.

Figure 4:
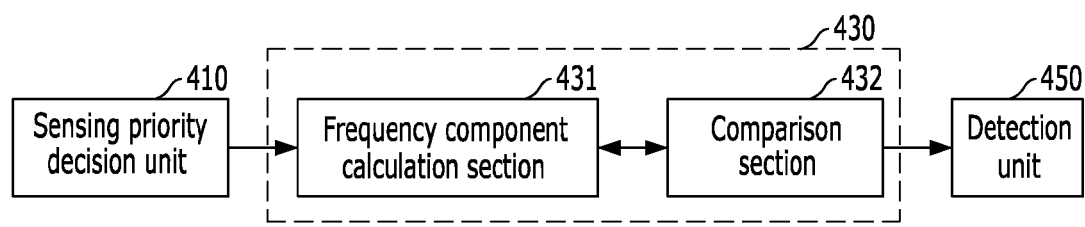
FIG. 4 is block diagram of an apparatus for detecting a received signal in accordance with another embodiment of the present invention.

FIG. 4 is block diagram of an apparatus for detecting a received signal in accordance with another embodiment of the present invention.

Referring to FIG. 4, the received signal detection apparatus in accordance with the embodiment of the present invention includes a sensing priority decision unit 410, a calculation unit 430, and a detection unit 450. These units are implemented with the aid of a computer.

The sensing priority decision unit 410 is configured to divide the entire band of a previously known received signal into N frequency components, and decide the sensing priorities of the N frequency components. The operation of deciding the sensing priorities has been already described in FIGS. 2 and 3. Therefore, the description thereof will be omitted herein.

The calculation unit 430 may include a frequency component calculation section 431 and a comparison section 432.

The frequency component calculation section 431 is configured to calculate a first frequency component having the first priority among the N frequency components in accordance with the priorities decided by the sensing priority decision unit 410, and calculate the magnitude of the calculated first frequency component. Furthermore, when the comparison section 432 issues an instruction to calculate the next-highest priority frequency component and the magnitude thereof, the frequency component calculation section 431 performs the calculation.

The comparison section 422 compares the magnitude of the first frequency component calculated by the frequency component calculation section 431 with the threshold value. As a result of the comparison operation, when the magnitude of the first frequency component is larger than the threshold value, the comparison section 422 transfers the frequency component to the detection unit 450. On the other hand, when the magnitude of the first frequency component is smaller than the threshold value, the comparison section 432 instructs the frequency component calculation section 431 to calculate a second frequency component which is the next-highest priority frequency component and the magnitude thereof. That is, when the magnitude of a specific frequency component calculated by the frequency component calculation section 431 is smaller than the threshold value, the comparison section 432 instructs the frequency component calculation section 431 to calculate the next-highest priority frequency component and the magnitude thereof.

Furthermore, the comparison section 432 may limit the maximum repetition number of the operation of comparing the magnitude of a specific frequency component with the threshold value. That is, when a user sets the maximum repetition number to a certain number, the comparison section 432 performs the comparison by the certain number. Accordingly, although the magnitude of the last frequency component is smaller than the threshold value, the comparison section 432 does not issue an instruction to the frequency component calculation section 431.

The detection unit 450 is configured to detect the signal of the specific frequency component transferred from the comparison section 432.

In the above described method and apparatus for detecting a received signal, the entire band is divided into N frequency components, the priorities of the divided frequency components are decided, and the sensing is performed in accordance with the decided priorities, different from the existing received signal detection method and apparatus in which the entire frequency spectrums of the received signal are sensed at one time. Therefore, it is possible to minimize the complexity of calculation and the amount of calculation in the received signal detection process. Furthermore, it is easy to detect a received signal even in such an environment as a wireless channel in which a frequency offset exists.

When the method and apparatus for detecting a signal in accordance with the embodiments of the present invention is used, it is possible to reduce the complexity of calculation for detecting the received signal. Furthermore, it is possible to minimize the amount of calculation for detecting the received signal. Furthermore, the received signal may be detected even in such an environment as a wireless channel in which a frequency offset exists.

While the present invention has been described with respect to the specific embodiments, it will be apparent to those skilled in the art that various changes and modifications may be made without departing from the spirit and scope of the invention as defined in the following claims.

What is claimed is:

1. A method for detecting a received signal, comprising:
   dividing the entire band of the received signal into N frequency components where N is a natural number larger than one, and deciding a reference frequency component containing a reference frequency as a first priority sensing band among the N frequency components;
   deciding the sensing priorities of the other (N−1) frequency components in such a manner that the sensing priorities spread in both directions from the first priority sensing band;
   calculating the magnitude of at least one of the N frequency components in accordance with the decided sensing priorities;
   comparing the calculated magnitude of the frequency component with a predetermined threshold value; and
   when the calculated magnitude of the frequency component is larger than the threshold value, determining that the received signal exists.

2. The method of claim 1, wherein, when the calculated magnitude of the frequency component is smaller than the threshold value, the magnitude of the next-highest priority frequency component is calculated, and the calculated magnitude of the next-highest priority frequency component is compared with the threshold value.

3. The method of claim 2, further comprising:
   when the calculated magnitude of the frequency component is smaller than the threshold value, determining whether or not the priority of the frequency component is equal to a predetermined number limitation parameter which is larger than one and smaller than N; and
   when it is determined that the priority of the frequency component is equal to the predetermined number limitation parameter, determining that the received signal does not exist.

4. The method of claim 3, wherein, when it is determined that the priority of the frequency component is not equal to the predetermined number imitation parameter, the magnitude of the next-highest priority frequency component is calculated, and the calculated magnitude of the next-highest priority frequency component is compared with the threshold value.

5. The method of claim 1, wherein, when all the magnitudes of the N frequency components are smaller than the threshold value, it is determined that the received signal does not exist.

6. An apparatus for detecting a received signal, comprising:
   a sensing priority decision unit configured to divide the entire band of the received signal into N frequency components where N is a natural number larger than one, decide a reference frequency component including a reference frequency as a first priority sensing band among the N frequency components, and decide the sensing priorities of the other (N−1) frequency components in such a manner that the sensing priorities spread in both directions from the decided first priority sensing band;
   a calculation unit configured to calculate the magnitude of at least one of the N frequency components in accordance with the decided sensing priorities, and compare the calculated magnitude of the frequency component with a predetermined threshold value; and
   a detection unit configured to decide that the received signal exists, when the calculation unit determines that the calculated magnitude of the frequency component is larger than the threshold value.

7. The apparatus of claim 6, wherein, when the calculated magnitude of the frequency component is smaller than the threshold value, the calculation unit calculates the magnitude of the next-highest priority frequency component.

8. The apparatus of claim 7, wherein, when the calculated magnitude of the frequency component is smaller than the threshold value, the calculation unit determines whether or not the priority of the frequency component is equal to a predetermined number limitation parameter which is larger than one and smaller than N, and
   when the calculation unit determines that the priority of the frequency component is equal to the predetermined number limitation parameter, the detection unit determines that the received signal does not exist.

9. The apparatus of claim 8, wherein, when the priority of the frequency component is not equal to the number limitation parameter, the calculation unit calculates the magnitude of the next-highest priority frequency component, and compares the calculated magnitude of the next-highest priority frequency component with the threshold value.

10. The apparatus of claim 6, wherein, when the calculation unit determines that all the magnitudes of the N frequency components are smaller than the threshold value, the detection unit determines that the received signal does not exist.

* * * * *